(12) United States Patent
Kwon

(10) Patent No.: US 12,438,948 B2
(45) Date of Patent: Oct. 7, 2025

(54) METHOD FOR DATA INTERWORKING BETWEEN APPLICATION AND IoT DEVICE AND MIDDLEWARE DEVICE FOR PERFORMING THE METHOD

(71) Applicant: Korea Electronics Technology Institute, Seongnam-si (KR)

(72) Inventor: Tai Gil Kwon, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 62 days.

(21) Appl. No.: 18/397,739

(22) Filed: Dec. 27, 2023

(65) Prior Publication Data

US 2024/0223662 A1   Jul. 4, 2024

(30) Foreign Application Priority Data

Dec. 28, 2022 (KR) .......................... 10-2022-0187915

(51) Int. Cl.
*H04L 67/125* (2022.01)
*G16Y 10/75* (2020.01)
*G16Y 40/35* (2020.01)

(52) U.S. Cl.
CPC ............ *H04L 67/125* (2013.01); *G16Y 10/75* (2020.01); *G16Y 40/35* (2020.01)

(58) Field of Classification Search
CPC ........ G16Y 10/75; G16Y 40/35; G16Y 20/20; H04L 67/12; H04L 67/125; H04L 67/303; H04L 69/08; H04L 67/565
See application file for complete search history.

(56) References Cited

U.S. PATENT DOCUMENTS

| | | | |
|---|---|---|---|
| 2018/0338018 A1* | 11/2018 | S. ............................ | H04L 12/66 |
| 2020/0045546 A1* | 2/2020 | Zhou .................. | H04L 61/2514 |
| 2020/0128077 A1* | 4/2020 | Yu ........................... | H04L 69/18 |
| 2020/0374205 A1* | 11/2020 | Sharma .................. | H04L 67/12 |
| 2021/0105337 A1* | 4/2021 | Li .......................... | H04L 63/102 |

* cited by examiner

*Primary Examiner* — Jason D Recek
(74) *Attorney, Agent, or Firm* — Knobbe Martens Olson & Bear LLP

(57) ABSTRACT

Proposed are a method for data interworking between an application and an IoT device, and a middleware device for performing the method. The method may include generating matching information between an IoT device and a network protocol used by the IoT device based on IoT device profile information, and analyzing a request message received from an application device to extract IoT device information of a request target. The method may also include generating a request packet conforming to a network protocol used by a target IoT device based on the request message, the IoT device information of the target request, and the matching information, and transmitting the request packet to the target IoT device. The method may further include converting a response packet transmitted by the target IoT device in response to the request packet into a response message, and transmitting the response message to the application device.

5 Claims, 21 Drawing Sheets

FIG. 4B

```
11
{
  "type": "object",
  "properties": {
    "devices": {
      "type": "array",
      "items": [
        {
          "type": "object",
          "properties": {
            "name": {
              "type": "string"
            },
            "description": {
              "type": "string"
            },
```

```
"configuration": {
        "type": "object",
        "properties": {
          "name": {
            "type": "string"
          },
          "protocol": {
            "type": "string"
          },
          "address": {
            "type": "string"
          },
          "port": {
            "type": "integer"
          }
        },
      },
```

FIG. 4D

```
"deviceReources": {
        "type": "array",
        "items": [
          {
            "type": "object",
            "properties": {
              "name": {
                "type": "string"
              },
              "value": {
                "type": "object",
                "properties": {
                  "type": {
                    "type": "string"
                  }
                },
              },
              "autoEvent": {
                "type": "object",
                "properties": {
                  "active": {
                    "type": "boolean"
                  },
                  "interval": {
                    "type": "integer"
                  }
                },
              }
            },
```

```
"configuration":{
      "name":"My Configuration",
      "protocol":"Modbus TCP",
      "address":"192.168.0.18",
      "port":502,
},
```

```
"deviceReources":[
    {
      "name":"My Value1",
      "value":{
        "type":"Int16",
      },
      "autoEvent":{
        "active":false,
      },
    },
    {
      "name":"My Value2",
      "value":{
        "type":"Float32",
      },
      "autoEvent":{
        "active":true,
        "interval":100,
      },
    },
  ],
```

FIG. 5E

```
14
"deviceCommands":[
    {
      "name":"My Command",
      "command":{
        "type":"String",
      },
    },
  ],
  },
]
}
```

FIG. 6

```
{
  "type": "object",
  "properties": {
    "deviceId": {
      "type": "string"
    },
    "requestType": {
      "type": "string"
    },
    "requestId": {
      "type": "string"
    },
    "parameter": {
      "type": "object"
    }
  },
  "additionalProperties": false
}
```

FIG. 7

```
{
  "deviceId":"My Device",
  "requestType":"Resource",
  "requestId":"My Value1",
  "parameter":{
  }
}
```

FIG. 8

```
{
  "type": "object",
  "properties": {
    "deviceId": {
      "type": "string"
    },
    "responseType": {
      "type": "string"
    },
    "responseId": {
      "type": "string"
    },
    "results": {
      "type": "object",
      "properties": {
        "status": {
          "type": "boolean"
        },
        "valueType": {
          "type": "string"
        },
        "value": {
          "type": "array",
          "items": [
            {
              "type": "number"
            },
          ]
        }
      },
    }
  },
  "additionalProperties": false
}
```

FIG. 9

```
{
  "deviceId":"My Device",
  "responseType":"Resource",
  "responseId":"My Value1",
  "results":
  {
    "status":true,
    "valueType":"Int16",
    "value":[-18,]
  }
}
```

FIG. 10

```
{
  "type": "object",
  "properties": {
    "eventId": {
      "type": "string"
    },
    "timeStamp": {
      "type": "integer"
    },
    "readings": {
      "type": "object",
      "properties": {
        "deviceName": {
          "type": "string"
        },
        "resourceName": {
          "type": "string"
        },
        "valueType": {
          "type": "string"
        },
        "value": {
          "type": "array",
          "items": [
            {
              "type": "number"
            },
          ]
        }
      }
    }
  },
  "additionalProperties": false
}
```

"eventId":"a33a569c-0a77-400d-8c90-26907a522b41",
  "timeStamp":1641199777984549070,
  "readings":{
    "deviceName":"My Device",
    "resourceName":"My Value2",
    "valueType":"Float32",
    "value":[3.141592, 12.093]
  }
}
```

METHOD FOR DATA INTERWORKING BETWEEN APPLICATION AND IoT DEVICE AND MIDDLEWARE DEVICE FOR PERFORMING THE METHOD

CROSS-REFERENCE TO RELATED APPLICATION

This application claims priority to and the benefit of Korean Patent Application No. 10-2022-0187915, filed on Dec. 28, 2022, the disclosure of which is incorporated herein by reference in its entirety.

BACKGROUND

Technical Field

The present disclosure relates to a method for data interworking between application and an Internet of Things (IOT) device, and a middleware device for performing the method.

Description of Related Technology

The Internet of Things (IOT) is a technology that connects a physical object with a built-in sensor and a communication function to the Internet. Through the IoT, connected industrial manufacturing plants, intelligent data analytics, next-generation healthcare services, smart homes and cities, wearable devices, and the like may be realized. The IoT may enable data-based insights, improved operational processes, and efficient data utilization, thus allowing new business models to be created.

SUMMARY

One aspect is a method and apparatus for data interworking between an application and an IoT device using middleware, which allows an application to transmit and receive data to and from an IoT device through a common interface provided by middleware without directly supporting a network protocol of the IoT device.

Another aspect is a method for data interworking between an application and an Internet of Thing (IoT), the method including: generating, by a middleware device, matching information between an IoT device and a network protocol used by the IoT device based on IoT device profile information regarding IoT devices; analyzing, by the middleware device, a request message received from an application device to extract IoT device information of a request target; generating, by the middleware device, a request packet conforming to a network protocol used by a target IoT device of the request message based on the request message, the IoT device information, and the matching information; transmitting, by the middleware device, the request packet to the target IoT device; converting, by the middleware device, a response packet transmitted by the target IoT device in response to the request packet into a response message; and transmitting, by the middleware device, the response message to the application device.

The request message and the response message may be messages conforming to the JavaScript Object Notation (JSON) data format.

The IoT device profile information may include an identifier of the IoT device and information on a network protocol used by the IoT device.

The IoT device profile information may include information about sensing data received from the IoT device.

The IoT device profile information may include information for controlling an actuator associated with the IoT device.

The IoT device profile information may conform to the JSON data format.

Another aspect is a middleware device for performing data interworking between an application and an Internet of Thing (IOT), the middleware device including: a communication module configured to receive a request message from an application device; a profile information processing module configured to generate matching information between an IoT device and a network protocol based on IoT device profile information; a message analysis module configured to analyze the request message to extract IoT device information of a request target from the request message; a packet generating module configured to generate a request packet conforming to a network protocol used by a target IoT device of the request message based on the IoT device information and the matching information; and a message generating module configured to convert a response packet transmitted by the target IoT device in response to the request packet into a response message. The communication module is configured to transmit the request packet to the target IoT device, receive the response packet from the target IoT device, and transmit the response message to the application device.

The request message and the response message may conform to the JSON data format.

Aspects of the present disclosure are not limited to the above, and other aspects that are not described above may become apparent to those of ordinary skill in the art based on the following descriptions.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

FIGS. 4A to 4E are diagrams illustrating a JSON data format of IoT device profile information.

FIGS. 5A to 5E are exemplary diagrams of IoT device profile information according to the JSON data format.

FIG. 6 is a diagram of a JSON data format of a request message.

FIG. 7 is an exemplary diagram illustrating a request message according to the JSON data format.

FIG. 8 is a diagram of a JSON data format of a response message.

FIG. 9 is an exemplary diagram illustrating a response message according to the JSON data format.

FIG. 10 is a diagram of a JSON data format of an event message.

FIG. 11 is an exemplary diagram illustrating an event message according to the JSON data format.

DETAILED DESCRIPTION

Figure 1:
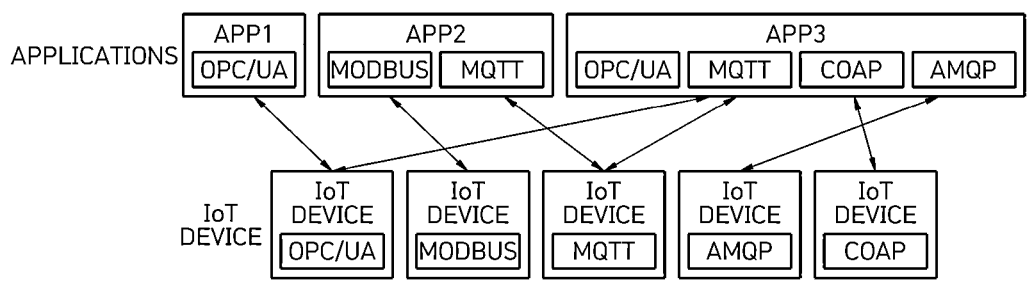
FIG. 1 is a block diagram illustrating a data interworking structure between applications and IoT devices.

FIG. 1 is a diagram showing a data interworking structure between applications and IoT devices. IoT devices may use a variety of network protocols, and an application may need to use the same network protocol as a network protocol used by an IoT device to communicate with the IoT devices. In other words, since network protocols used by IoT devices are very diverse, in order to communicate smoothly with an IoT device, the applications need to support all of the numerous network protocols used by various IoT devices. Additionally, when a single IoT device and a plurality of applications simultaneously communicate with each other, there is a need to support the same network protocol redundantly for each application. As described above, when an application follows the conventional method of having to support all of the network protocols of IoT devices to communicate with an IoT device, development resources are wasted and development difficulties increase, which leads to an increase in application research and development costs and time.

Advantages and features of the present disclosure and ways to achieve them will become readily apparent with reference to the following detailed description of embodiments in conjunction with the accompanying drawings. The present disclosure is not limited to the embodiments disclosed below, and may be embodied in various forms. The embodiments to be described below are only embodiments provided to complete the disclosure of the present disclosure and fully inform those skilled in the art to which the present disclosure pertains of the scope of the invention, and the present disclosure is defined only by the scope of the appended claims. Meanwhile, terms used herein are used to aid in the explanation of the present disclosure and are not intended to limit the scope and spirit of the present disclosure. It should be understood that the singular forms also include the plural forms unless the context clearly dictates otherwise. The terms "comprise," "comprising," "include," and/or "including" used herein specify the presence of stated components, steps, operations and/or elements and do not preclude the presence or addition of one or more other components, steps, operations and/or elements.

In the description of the present disclosure, detailed descriptions of related known technologies will be omitted when it is determined that they may unnecessarily obscure the gist of the present disclosure.

Hereinafter, the present disclosure will be described in detail by describing exemplary embodiments of the present disclosure with reference to the accompanying drawings. In the drawings, like numbers refer to like elements throughout the description of the drawings.

1. Data Interworking Structure Between Applications and IoT Devices

Figure 2:
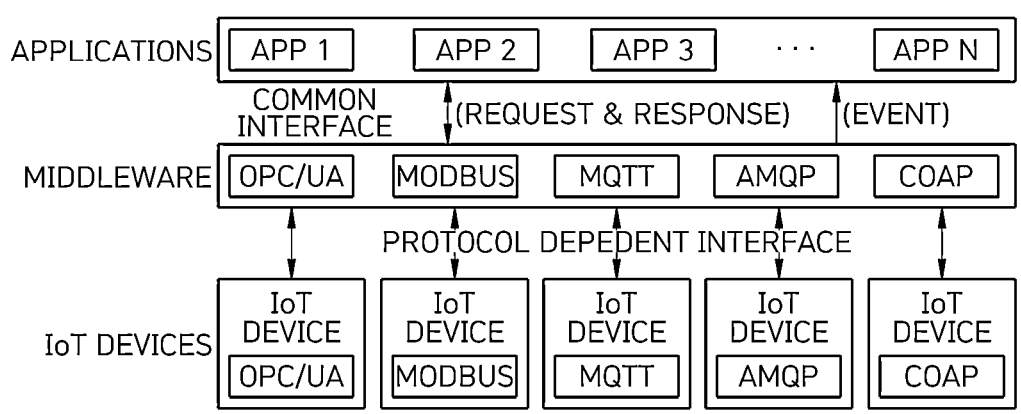
FIG. 2 is a block diagram illustrating a data interworking structure between applications and IoT devices according to an embodiment of the present disclosure.

FIG. 2 is a block diagram illustrating a data interworking structure between applications and IoT devices according to an embodiment of the present disclosure.

The data interworking structure may be broadly divided into three layers: applications, middleware, and IoT devices. The applications indirectly communicate with the IoT devices through the middleware without directly communicating with the IoT devices. In other words, the middleware handles data interworking between the applications and the IoT devices on behalf of the applications and the IoT devices. The middleware supports network protocols (e.g., OPC/UA, MODBUS, MQTT, AMQP, and COAP) required for data interworking between an application and a plurality of IoT devices. According to the data interworking structure between applications and IoT devices of the present disclosure, all applications communicate through a common interface provided by the middleware, while the IoT devices communicate with the middleware through a network protocol-dependent interface, thereby enabling bidirectional communication between the applications, the middleware, and the IoT devices.

2. IoT Device Profile Information

Figure 3:
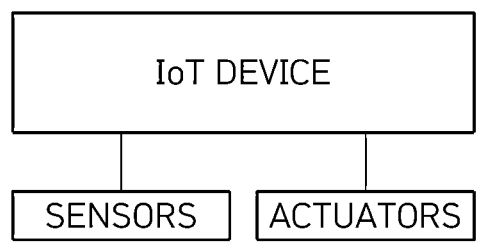
FIG. 3 is a block diagram illustrating a basic configuration of an IoT device.

FIG. 3 is a block diagram illustrating a basic configuration of an IoT device. As shown in FIG. 3, an IoT device interacts with various sensors or actuators. Additionally, the IoT device may include sensors or actuators.

The IoT device according to an embodiment of the present disclosure transmits sensing data collected through the sensor to the middleware or controls the actuator according to a command received from the middleware. Profile information of the IoT device (hereinafter referred to as "IoT device profile information") varies depending on the sensors and actuators included in or linked to the IoT device. Therefore, the middleware needs to secure the IoT device profile information in advance to collect sensing data from the sensor linked to the IoT device or from the IoT device, or control the actuator through the IoT device based on the IoT device profile information. Therefore, before performing data interworking between an application and an IoT device, the middleware needs to acquire IoT device profile information externally and register the acquired IoT device profile information in an internal storage in advance.

Hereinafter, in this specification, a sensor included in or linked to an IoT device is expressed as a sensor "associated" with the IoT device, and an actuator included in or linked to an IoT device is expressed as an actuator "associated" with the IoT device.

According to an embodiment of the present disclosure, IoT device profile information used by a method for data interworking between an application and an IoT device and a middleware device for performing the method includes (1) general information, (2) configuration information, (3) resource information, and (4) command information.

(1) General information includes an identifier of an IoT device and IoT device description information. In the present disclosure, "name of an IoT device" is used with the same meaning as an identifier of the IoT device.

(2) Configuration information is information required for network interoperation between middleware and IoT devices. The configuration information includes a configuration identifier (in the present disclosure, "configuration name" is also used with the same meaning as a configuration identifier), a network interoperability protocol between middleware and an IoT device (referred to a network protocol used by an IoT device), and an address and a port number required for network interconnection with an IoT device.

(3) Resource information is information about sensing data (which may be referred to as a "sensing value") received from a sensor associated with an IoT device or an IoT device. The resource information includes the type of sensing value and information about automatic event settings.

(4) Command information is information for controlling an actuator associated with an IoT device and includes information such as a command type.

Figure 4A:
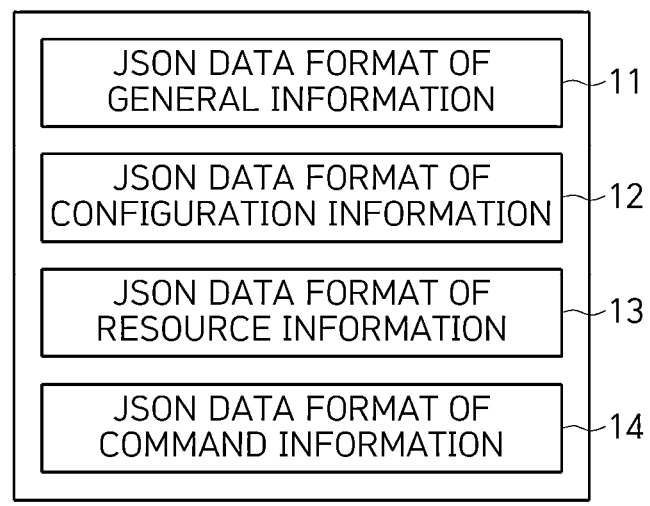
Figure 4E:
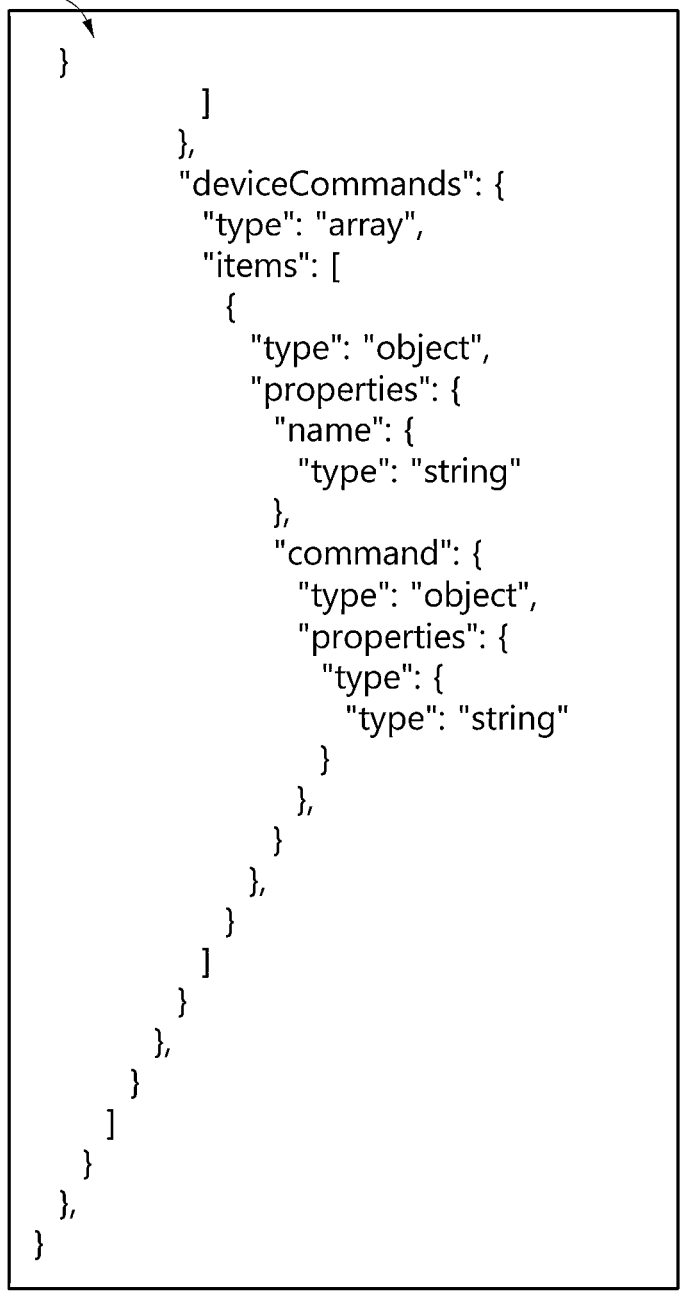

FIGS. 4A to 4E are diagrams illustrating the JSON data format of IoT device profile information used by a method for data interworking between an application and an IoT device and a middleware device for performing the method. Considering that IoT devices may have various pieces of IoT device profile information, the present disclosure allows flexible addition of required information as an option inside an JSON object. The JSON data format of the IoT device profile information according to an embodiment of the present disclosure shown in FIG. 4A is divided into four parts: a JSON data format of general information 11, a JSON data format of configuration information 12, a JSON data format of resource information 13, and a JSON data format of command information 14. FIG. 4B illustrates the JSON data format of general information 11, FIG. 4C illustrates the JSON data format of configuration information 12, FIG. 4D illustrates the JSON data format of resource information 13, and FIG. 4E illustrates the JSON data format of command information 14.

Table 1 is a table describing the meaning of each item included in the JSON data format of the IoT device profile information according to an embodiment of the present disclosure. Through Table 1, the specific meaning of the JSON data format of the IoT device profile information can be identified.

TABLE 1

| Name | Type | Description |
| --- | --- | --- |
| Devices | array | IoT device information |
| Name | string | an IoT device identifier (IOT device name) |
| Description | string | IoT device description |
| configuration | JSON object | configuration information |
| Name | string | a configuration identifier (configuration name) |
| Protocol | string | a network protocol used by an IoT device |
| Address | string | an access address for an IoT device (an IP or device number, etc.) |
| Port | integer | an access port for an IoT device |
| deviceResource | array | resource information |
| name | string | a resource name(a resource identifier) |
| value | JSON object | a sensing value |
| type | string | a value type(Int8, Int16, Int32, Int64, Uint8, Uint16, Uint32, Uint64, Float32, Float64, Bool) |
| autoEvent | JSON object | an automatic event |
| active | boolean | whether an event is activated (activated (true), deactivated (false)) |
| interval | integer | an event occurrence interval (microsecond) |
| deviceCommand | array | command information |
| name | string | a command name |
| command | JSON object | a control command |
| type | string | a command type (string or binary) |

Figure 5A:
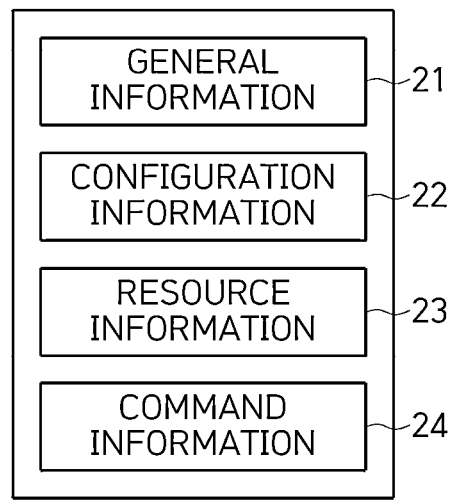
Figure 5B:
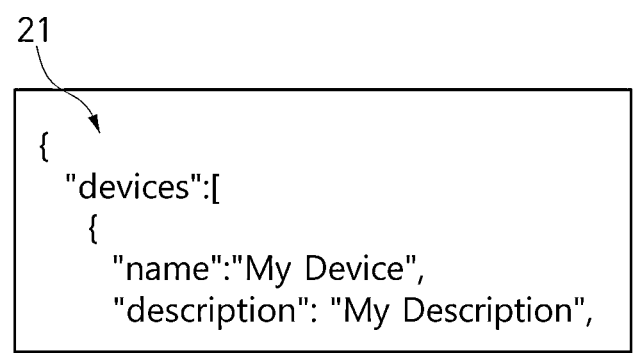

FIGS. 5A to 5E are exemplary diagrams of IoT device profile information according to the JSON data format. The IoT device profile information shown in FIGS. 5A to 5E conforms to the JSON data format shown in FIGS. 4A to 4E and Table 1. The IoT device profile information according to an embodiment of the present disclosure, shown in FIG. 5A, includes four parts: general information 21, configuration information 22, resource information 23, and command information 24. FIG. 5B illustrates an example of the general information 21, FIG. 5C illustrates an example of the configuration information 22, FIG. 5D illustrates an example of the resource information 23, and FIG. 5E illustrates an example of the command information 24.

FIG. 5B is an example of the general information 21, showing an IoT device identifier "My Device" and an IoT device description "My Description."

FIG. 5C is an example of the configuration information 22, showing a configuration identifier "My Configuration," a network protocol "Modbus TCP" used by the IoT device, an access address "192.168.0.18" for the IoT devices, and an access port "502" for the IoT device.

FIG. 5D is an example of the resource information 23, showing a resource name "My Value1" or "My Value2," a type of a sensing value "Int16" or "Float32," and whether an automatic event is activated "false" or "true," and an occurrence interval of an automatic event "100," which means 100 microseconds.

FIG. 5E is an example of the command information 24, showing a command name "My Command" and a command type "String" of a control command.

3. Common Interface Between Application and Middleware

In order for an application to acquire sensing data (sensing values) from a sensor associated with an IoT device or to control an actuator associated with an IoT device, a common interface is present between applications and middleware, as shown in FIG. 2. The common interface between applications and middleware includes (1) a request and response and (2) an event.

(1) In the case of a request and response, when the application transmits a request message regarding a resource or command to the middleware using the common interface, the middleware operates by transmitting a response message to the application in response to the application's request message.

(2) In the case of an event, when an activation status information (active) of an automatic event autoEvent included in the resource information (see FIG. 4D and Table 1) among the IoT device profile information in the JSON data format is true, the middleware operates by periodically transmitting an event message to the application according to an event occurrence interval Interval.

FIG. 6 is a diagram of a JSON data format of a request message, and Table 2 is a table describing the meaning of each item included in the JSON data format of the request message. Through Table 2, the specific meaning of each item included in the JSON data format of the request message is identified.

TABLE 2

| Name | Type | Description |
| --- | --- | --- |
| deviceId | string | an identifier of an IoT device to which a request message is to be transmitted |

TABLE 2-continued

| Name | Type | Description |
| --- | --- | --- |
| requestType | string | a request type ("Resource" or "Command") |
| requestId | string | an identifier of a request ("Resource" or "Command") |
| parameter | JSON object | Parameters to be transmitted to a request target |

In the JSON data format for the request message, the request type requestType is divided into a resource Resource and a command Command. The resource Resource refers to acquiring a sensing value of a sensor associated with an IoT device, and the command Command_ refers to controlling an actuator. The request identifier requestId is a resource name ("name" of "deviceResource") defined in Table 1 when the request type is "Resource," and is a command name ("name" of "deviceCommand") defined in Table 1 when the request type is "Command." The device identifier deviceId refers to the identifier of the IoT device that is a transmission target of a request message, and the parameter parameter represents additional information determined according to the request identifier.

FIG. 7 is an exemplary diagram illustrating a request message according to the JSON data format. The request message shown in FIG. 7 is a message that is transmitted by an application to middleware to acquire sensing data (a sensing value) of a sensor associated with an IoT device. The request message shown in FIG. 7 includes an identifier "My Device" of a transmission target IoT device, a request type "Resource," and a request identifier "My Value1," of the request message.

FIG. 8 is a diagram of a JSON data format of a response message, and Table 3 is a table describing the meaning of each item included in the JSON data format of the response message. Through Table 3, the specific meaning of each item included in the JSON data format of the response message can be identified.

TABLE 3

| Name | Type | Description |
| --- | --- | --- |
| deviceId | string | an identifier of an IoT device that is the entity transmitting a response |
| responseType | string | a response type ("Resource" or "Command") |
| responseId | string | an identifier of a response ("Resource" or "Command") |
| Results | JSON object | response results |
| status | boolean | a status of a request (true(success), false(failure)) |
| value | array | a return value according to a request (an array including one or more numbers) |

In the JSON data format for the response message, the response type responseType is divided into a resource Resource and a command Command. A resource Resource refers to responding to a sensing value of a sensor associated with an IoT device, and a command Command refers to controlling an actuator. A response identifier responseId is a resource name ("name" of "deviceResource") defined in Table 1 when the request type is "Resource," and is a command name ("name" of "deviceCommand") defined in Table 1 when the response type is "Command." A device identifier deviceId refers to an identifier of an IoT device that is the entity transmitting the response, and the response results include the status of the request and return value information according to the request.

FIG. 9 is an exemplary diagram illustrating a response message according to the JSON data format. The response message shown in FIG. 9 is a message in which middleware transmits sensing data (a sensing value) of a sensor associated with a target IoT device to an application in response to an application's request message. The response message shown in FIG. 9 includes an identifier of an IoT device that is the entity "My Device" transmitting a response, a response type "Resource," a response identifier "My Value1," and response results. The response results include the status "true" of the request, the type of value "Int16," and the return value "−18" according to the request.

FIG. 10 is a diagram of a JSON data format of an event message, and Table 4 is a table describing the meaning of each item included in the JSON data format of the event message.

TABLE 4

| Name | Type | Description |
| --- | --- | --- |
| eventId | string | an event identifier (128-bit UUID) |
| timeStamp | integer | the time when an event was generated (nanosecond) |
| readings | JSON object | event reception content |
| deviceName | string | an identifier of an IoT device transmitting an event (a device name) |
| resourceName | string | a resource name(a resource identifier) |
| valueType | string | the type of value((Int8, Int16, Int32, Int64, Uint8, Uint16, Uint32, Uint64, Float32, Float64, Bool) |
| value | array | a value included in an event (an array including one or more numbers) |

In the JSON data format for the event message, an event identifier eventId is an identifier that distinguishes each event. The event identifier may be a 128-bit universally unique identifier (UUID). A timestamp timeStamp represents the time when the event was generated (e.g., a time expressed in nanoseconds), and event reception content readings includes information about an identifier of an IoT device transmitting an event (deviceName), a resource name (resourceName), the type of value (valueType), and a value included in the event value(value).

FIG. 11 is an exemplary diagram illustrating an event message according to the JSON data format. The event message shown in FIG. 11 is a message transmitted from middleware to an application in relation to a resource for which an automatic event autoEvent is activated. The event message shown in FIG. 11 includes an event identifier "a33a569c-0a77-400d-8c90-26907a522b41," a timestamp "1641199777984549070," and event reception content readings. The event reception content readings includes an identifier of an IoT device transmitting the event("My Device"), a name of resource ("My Value2"), the type of value ("Float32"), and a value included in the event ("[3.141592, 12.093]").

Meanwhile, when looking at the JSON data formats shown in FIGS. 6, 8, and 10, there is a setting called "additionalProperties": false at the end, which means that information items other than information defined in the common interface (a request, a response, and an event) cannot be added.

4. Method for Middleware to Perform Message Processing and Operation for Data Interworking Between Application and IoT Device Middleware directly communicates with applications and IoT devices and performs data interworking between the applications and IoT devices. In other words, middleware serves as a broker between the applications and IoT devices.

Figure 12:
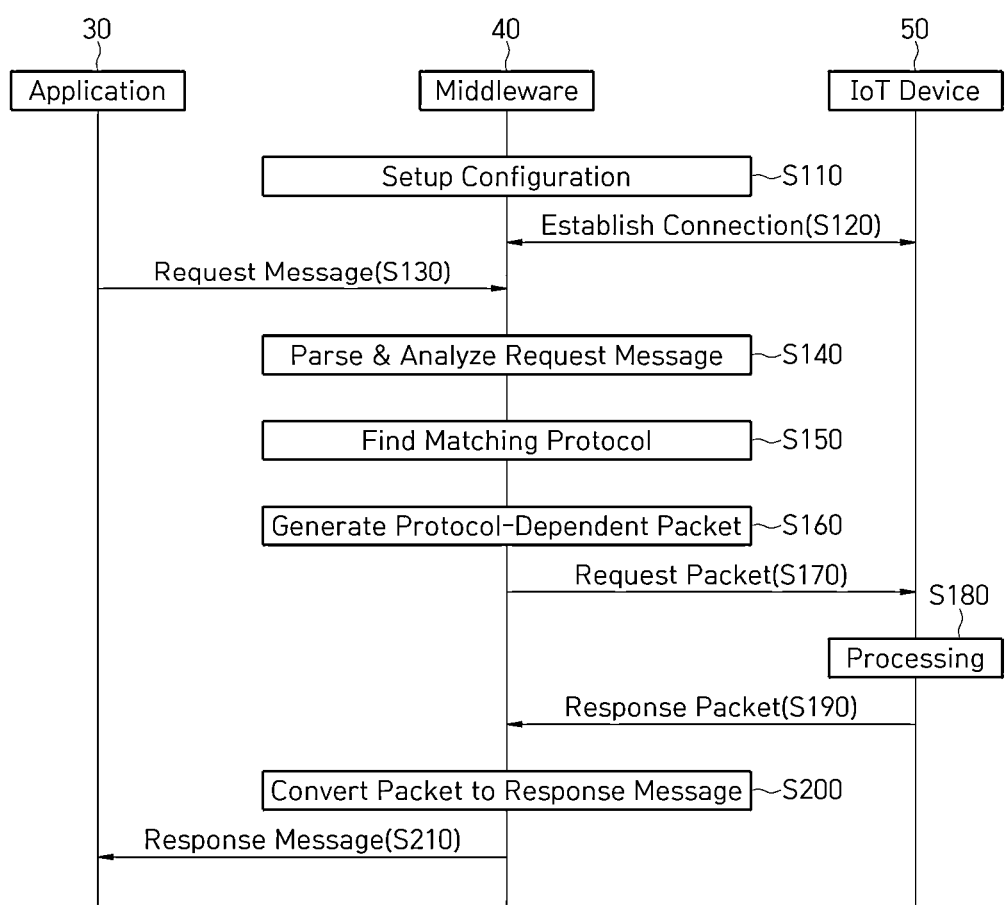
FIG. 12 is a flowchart showing a method for data interworking between an application and an IoT device according to an embodiment of the present disclosure.
Figure 13:
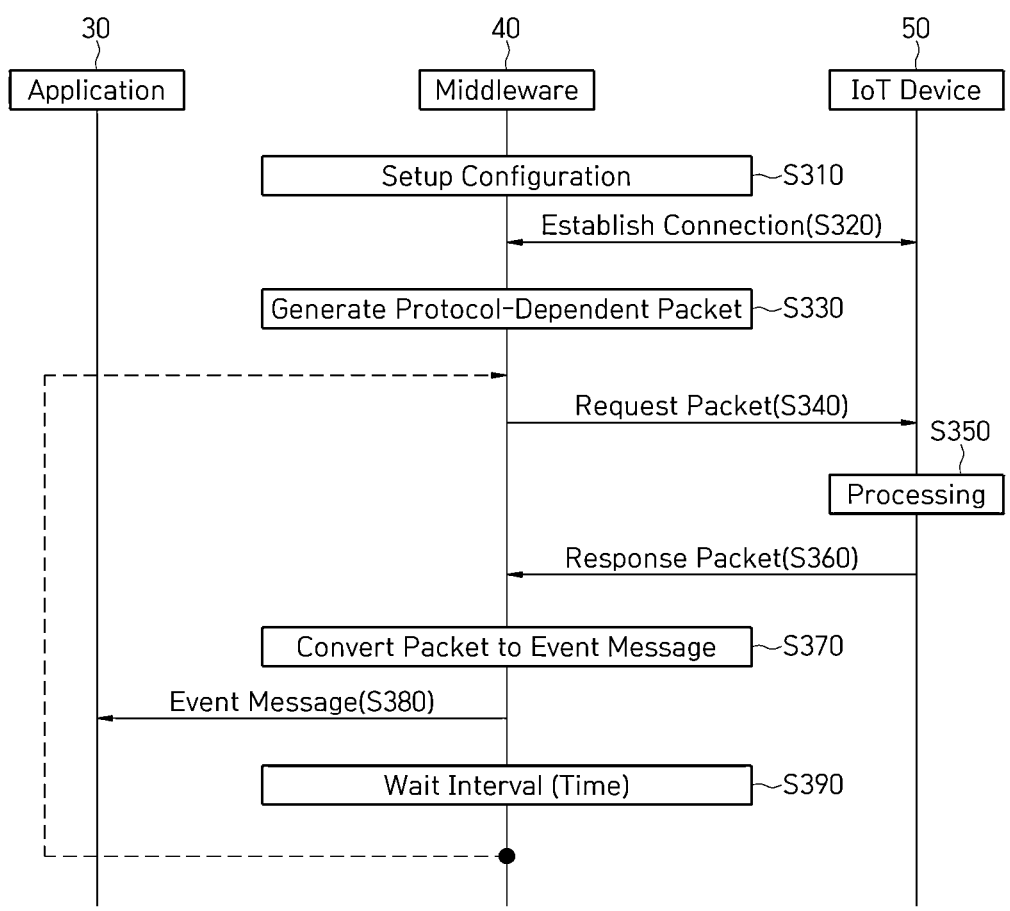
FIG. 13 is a flowchart showing a method for data interworking between an application and an IoT device according to an embodiment of the present disclosure.

FIGS. 12 and 13 are flowcharts for describing a method for middleware to perform message processing and operation for a common interface (a request, a response, and an event). That is, FIGS. 12 and 13 are flowcharts showing a method for data interworking between an application and an IoT device according to an embodiment of the present disclosure. FIG. 12 illustrates a request process of an application and a response process of middleware, and FIG. 13 illustrates an automatic event processing process by middleware. The method for data interworking shown in FIGS. 12 and 13 is performed through communication between a device equipped with an application (30, hereinafter abbreviated as an "application device"), a device equipped with middleware (40, hereinafter abbreviated as a "middleware device"), and an IoT device 50. The middleware may be mounted on the same device as the application, or may be mounted on different devices.

Before utilizing the common interface, the middleware first interprets IoT device profile information (general information, configuration information, resource information, and command information) according to the JSON data formats shown in FIGS. 4A to 4E to set various pieces of configuration information required by the middleware, and then performs data interworking between the application and the IoT device.

FIG. 12 is a flowchart showing a method for data interworking between an application and an IoT device according to an embodiment of the present disclosure. FIG. 12 shows the request and response processes as described above. The method for data interworking shown in FIG. 12 includes operations S110 to S210. The method for data interworking shown in FIG. 12 is based on one embodiment, and operations of the method for data interworking between an application and an IoT device according to the present disclosure are not limited to the embodiment shown in FIG. 12, and some operations may be added, changed, or deleted as needed.

Operation S110 is an operation in which the middleware device 40 sets configuration information required by the middleware device 40 based on IoT device profile information. The middleware device 40 may possess IoT device profile information about a plurality of IoT devices 50. The middleware device 40 generates matching information between an IoT device 50 and a network protocol used by the IoT device 50 based on the IoT device profile information. For example, the middleware device 40 extracts IoT device identifier information and information on a network protocol used by the IoT device 50, which are included in the IoT device profile information, to generate matching information (hereinafter abbreviated as 'matching information') between an IoT device identifier of the IoT device 50 and a network protocol used by the IoT device 50. The middleware device 40 may store the generated matching information in an internal storage, and thereafter utilize the stored matching information to search for a network protocol used by the IoT device 50, which becomes the target of a request message.

Operation S120 is an operation in which the middleware device 40 establishes a connection with the IoT device 50. The middleware device 40 may establish a connection with a plurality of IoT devices 50. The middleware device 40 may utilize the IoT device profile information in establishing a connection with the IoT device 50.

Operation S130 is an operation in which the middleware device 40 receives a request message from the application device 30. The application device 30 may transmit a request message in the JSON data format to the middleware device 40, and the middleware device 40 may receive the request message in the JSON data format.

Operation S140 is an operation in which the middleware device 40 parses the request message from the application device 30 and analyzes the parsed request message. The middleware device 40 parses the syntax of the request message and analyzes the parsed syntax so that the request message of the application device 30 is able to be interpreted. The middleware device 40 extracts information about a target IoT device (e.g., an IoT device identifier) from the request message.

Operation S150 is an operation in which the middleware device 40 searches for a network protocol that matches the target IoT device 50. The middleware device 40 matches a network protocol for data interworking with a target IoT device of the request message. That is, the middleware device 40 searches for a network protocol used by the target IoT device 50 of the request message based on the target IoT device information (e.g., an IoT device identifier) and the matching information.

Operation S160 is an operation in which the middleware device 40 generates a packet dependent on the network protocol used by the target IoT device 50. The middleware device 40 generates a request packet that conforms to the network protocol used by the target IoT device 50 of the request message based on the request message.

Operation S170 is an operation in which the middleware device 40 transmits the request packet dependent on the network protocol to the target IoT device 50.

Operation S180 is an operation in which the IoT device 50 processes the packet. The target IoT device 50 receives the request packet, processes the request packet, and generates a response packet.

Operation S190 is an operation in which the middleware device 40 receives the response packet. The target IoT device 50 transmits a response packet corresponding to the request packet to the middleware device 40, and the middleware device 40 receives the response packet.

Operation S200 is an operation in which the middleware device 40 converts the response packet into a response message. The middleware device 40 converts the response packet into a response message conforming to the JSON data format shown in FIG. 8.

Operation S210 is an operation in which the middleware device 40 transmits the response message to the application device 30. The middleware device 40 transmits the response message corresponding to the request message of the application device 30 to the application device 30.

FIG. 13 is a flowchart for describing a method for data interworking between an application and an IoT device according to an embodiment of the present disclosure. FIG. 13 shows an automatic event processing process of the middleware device 40 as described above. The method for data interworking shown in FIG. 13 includes operations S310 to S390. The method for data interworking shown in FIG. 13 is based on one embodiment, and the operations of the method for data interworking between an application and an IoT device according to the present disclosure are not limited to the embodiment shown in FIG. 13, and some operations are added, changed or deleted as needed.

Operation S310 is an operation in which the middleware device 40 sets configuration information required by the middleware device 40 based on IoT device profile information. The middleware device 40 may possess IoT device profile information about a plurality of IoT devices 50. The middleware device 40 generates matching information between an IoT device 50 and a network protocol used by the IoT device 50 based on the IoT device profile information. For example, the middleware device 40 extracts IoT device identifier information and information on a network protocol used by the IoT device 50, which are included in the IoT device profile information, to generate matching information (hereinafter abbreviated as "matching information") between an IoT device identifier of the IoT device 50 and a network protocol used by the IoT device 50.

Operation S320 is an operation in which the middleware device 40 establishes a connection with the IoT device 50. The middleware device 40 may establish a connection with a plurality of IoT devices 50. The middleware device 40 may utilize the IoT device profile information in establishing a connection with the IoT device 50.

Operation S330 is an operation in which the middleware device 40 generates a packet dependent on the network protocol used by the IoT device 50. The middleware device 40 generates a request packet dependent on a protocol for data interworking with the IoT device 50 based on resource information included in the IoT device profile information. That is, the middleware device 40 generates a request packet conforming to the network protocol used by the IoT device 50. The request packet is a request packet targeting a resource for which an automatic event autoEvent is activated among the resource information included in the IoT device profile information.

Operation S340 is an operation in which the middleware device 40 transmits the request packet dependent on the network protocol to the IoT device 50.

Operation S350 is an operation in which the IoT device 50 processes the packet. The IoT device 50 receives the request packet, processes the request packet, and generates a response packet.

Operation S360 is an operation in which the middleware device 40 receives a response packet. The IoT device 50 transmits a response packet corresponding to the request packet to the middleware device 40, and the middleware device 40 receives the response packet.

Operation S370 is an operation in which the middleware device 40 converts the response packet into an event message. The middleware device 40 converts the response packet into an event message Event conforming to the JSON data format shown in FIG. 10.

Operation S380 is an operation in which the middleware device 40 transmits the event message to the application device 30.

Operation S390 is an operation in which the middleware device 40 waits for a set event occurrence interval Interval. The middleware device 40 waits for a preset event occurrence interval (Interval, for example, 100 microseconds) of an automatic event autoEvent included in the resource information of the IoT device profile information.

Afterwards, the middleware device 40 returns to operation S340 and performs operation S340 and subsequent operations. That is, the middleware device 40 periodically repeats a process of transmitting a previously generated request packet to the IoT device 50 again, converting a response packet into an event message, and transmitting the event message to the application device 30.

The method for data interworking between an application and an IoT device has been described above with reference to the flowcharts presented in the drawings. While the above method has been shown and described as a series of blocks for the purpose of simplicity, it is to be understood that the invention is not limited to the order of the blocks, and that some blocks may be executed in a different order from those shown and described herein or executed concurrently with other blocks, and various other branches, flow paths, and sequences of blocks that achieve the same or similar results may be implemented. In addition, not all illustrated blocks may be required for implementation of the method described herein.

Meanwhile, in the description with reference to FIGS. 12 to 13, each operation may be further divided into a larger number of sub-operations or combined into a smaller number of operations according to examples of implementation of the present disclosure. In addition, some of the operations may be omitted or may be performed in changed order as needed. In addition, even in the case of omitted content, the content of FIGS. 2 to 11 may be applied to the content of FIGS. 12 to 13. In addition, the content of FIGS. 12 to 13 may be applied to the content of FIGS. 2 to 11.

Figure 14:
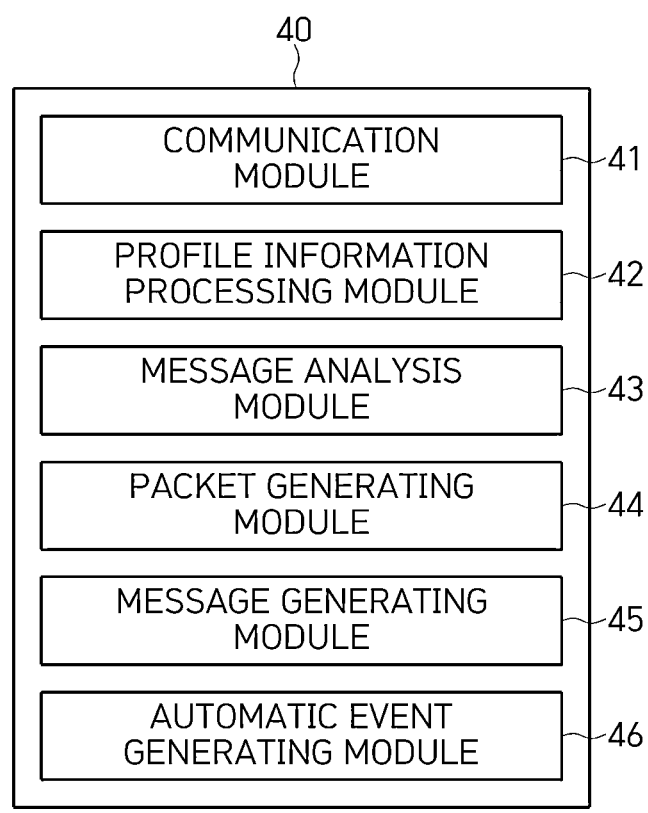
FIG. 14 is a block diagram illustrating a configuration of a middleware device performing data interworking between an application and an IoT device, according to an embodiment of the present disclosure.

FIG. 14 is a block diagram illustrating a configuration of a middleware device for performing data interworking between an application and an IoT device, according to an embodiment of the present disclosure.

A middleware device 40 for performing a method for data interworking between an application and an IoT device according to an embodiment of the present disclosure includes a communication module 41, a profile information processing module (or profile information processor) 42, a message analysis module (or message analysis processor) 43, a packet generating module (or packet generating processor) 44, a message generating module (or message generating processor) 45, and an automatic event generating module (or automatic event generating processor) 46. The middleware device shown in FIG. 14 is based on one embodiment, and components of the middleware device 40 according to the present disclosure are not limited to the embodiment shown in FIG. 14, and some components may be added, changed, or deleted as needed.

The communication module 41 establishes a connection with the application device 30 and the IoT device 50. The communication module 41 may utilize pre-stored IoT device profile information when establishing a connection with the IoT device 50. The communication module 41 transmits and receives messages and data packets to and from the application device 30 and the IoT device 50. The communication module 41 receives a request message from the application device 30, transmits a request packet to a target IoT device 50 of the request message, receives a response packet from the target IoT device 50 of the request message, and transmits a response message to the application device 30. The request message transmitted from the application device 30 to the communication module 41 and the response message transmitted from the communication module 41 to the application device 30 may be messages conforming to the JSON data format.

The profile information processing module 42 sets configuration information required by the middleware device 40 based on the pre-stored IoT device profile information. The profile information processing module 42 generates matching information between the IoT device 50 and the network protocol used by the IoT device 50 based on the IoT device profile information. For example, the profile information processing module 42 extracts IoT device identifier information and information on a network protocol used by the IoT device 50 from the IoT device profile information to generate matching information between an IoT device identifier of the IoT device 50 and a network protocol used by the IoT device 50.

The message analysis module 43 analyzes the request message of the application device 30 to extract request target IoT device information from the request message. The message analysis module 43 parses the syntax of the request message so that the request message of the application device 30 is able to be interpreted, and then analyzes the parsed syntax to extract the request target IoT device information from the request message.

The packet generating module 44 generates a request packet that conforms to the network protocol used by the target IoT device of the request message of the application device 30 based on the matching information between the request target IoT device information and the network protocol of the IoT device 50.

Specifically, the packet generating module 44 searches for a network protocol matching the IoT device 50. The packet generating module 44 matches a network protocol for data interworking with a target IoT device of the request message. That is, the packet generating module 44 searches for a network protocol used by the target IoT device 50 of the request message based on the target IoT device information (e.g., an IoT device identifier) and the matching information. In addition, the packet generating module 44 generates a request packet depending on the network protocol used by the target IoT device 50. The request packet generated as described above is transmitted to the target IoT device 50 by the communication module 41.

Meanwhile, when there is a resource for which an automatic event autoEvent is active among the resource information included in the IoT device profile information, the packet generating module 44 generates a request packet dependent on a protocol for data interworking with the IoT device 50 based on the resource information included in the IoT device profile information. That is, when the middleware device 40 needs to transmit a response message to the application device 30 by an automatic event, the packet generating module 44 generates a request packet conforming to a network protocol used by the IoT device 50 based on the resource information of the IoT device profile information.

The message generating module 45 converts a response packet transmitted by the target IoT device 50 in response to the request packet into a response message. The message generating module 45 may convert the response packet into a response message conforming to the JSON data format shown in FIG. 8.

Meanwhile, in the case of an automatic event situation described above, the message generating module 45 converts the response packet transmitted by the IoT device 50 into an event message. In this case, the message generating module 45 may convert the response packet into an event message conforming to the JSON data format shown in FIG. 10. The communication module 41 transmits the event message to the application device 30.

When there is a resource for which an automatic event autoEvent is active among the resource information included in the IoT device profile information, in response to an event message being transmitted to the application device 30, the automatic event generating module 46 waits for a set event occurrence interval Interval, and generates an automatic event for the resource. As described above, the event occurrence interval Interval is setting information included in the resource information of the IoT device profile information.

When the automatic event generating module 46 generates an automatic event, the communication module 41 transmits a request packet, which is previously generated for the IoT device 50 for which the corresponding automatic event is activated, to the IoT device 50. According to the automatic event generation operation of the automatic event generating module 46, the middleware device 40 periodically repeats a process of transmitting a previously generated request packet to the IoT device 50, converting a response packet of the IoT device 50 into an event message, and transmitting the event message to the application device 30.

The middleware device 40 may be, but is not limited to, a server, smartphone, a tablet computer, a laptop computer, a desktop computer, a smart speaker, or a smart watch. Additionally, the middleware device 40 may be integrated with the application device 30. That is, the application and the middleware may be mounted on the same device.

Even in the case of content omitted from the description referring to FIG. 14, the content of FIGS. 2 to 13 may be applied to the content of FIG. 14. In addition, the content of FIG. 14 may be applied to the content of FIGS. 2 to 13.

Figure 15:
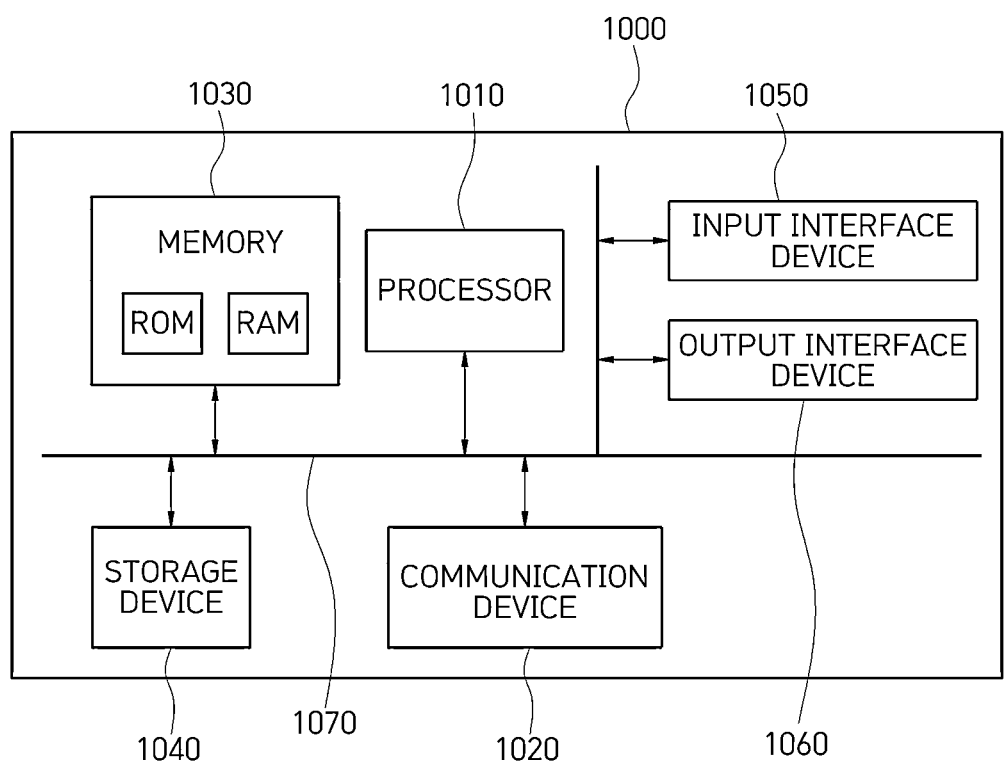
FIG. 15 is a block diagram illustrating a computer system for implementing a method for data interworking between an application and an IoT device according to an embodiment of the present disclosure.

FIG. 15 is a block diagram illustrating a computer system for implementing a data interworking method between an application and an IoT device according to an embodiment of the present disclosure.

The middleware device 40 according to the present disclosure may be implemented by the computer system of FIG. 15.

Referring to FIG. 15, a computer system 1000 may include at least one of a processor 1010, a memory 1030, an input interface device 1050, an output interface device 1060, and a storage device 1040 that communicate through a bus 1070. The computer system 1000 may further include a communication device 1020 coupled to a network. The processor 1010 may be a central processing unit (CPU) or a semiconductor device for executing instructions stored in the memory 1030 and/or storage device 1040. The memory 1030 and the storage device 1040 may include various forms of volatile or nonvolatile media. For example, the memory may include a read only memory (ROM) or a random access memory (RAM). In an embodiment of the present disclosure, the memory may be located inside or outside the processor and may be connected to the processor through various known means. The memory may include various forms of volatile or nonvolatile media, for example, may include a ROM or a RAM.

Accordingly, the present disclosure may be embodied as a method implemented by a computer or non-transitory computer readable media in which computer executable instructions are stored. According to an embodiment, when executed by a processor, computer readable instructions may perform a method according to at least one aspect of the present disclosure.

The communication device 1020 may transmit or receive a wired signal or a wireless signal.

In addition, the method according to the present disclosure may be implemented in the form of program instructions executable by various computer devices and may be recorded on computer readable media.

The computer readable media may be provided with program instructions, data files, data structures, and the like alone or in combination. The program instructions recorded on the computer readable media may be specially designed and constructed for the purposes of the present disclosure or may be well-known and available to those having skill in the art of computer software. The computer readable storage media include hardware devices configured to store and execute program instructions. For example, the computer readable storage media include magnetic media such as hard disks, floppy disks, and magnetic tape, optical media such as a compact disc (CD)-ROM and a digital video disk (DVD), magneto-optical media such as floptical disks, a ROM, a RAM, a flash memory, etc. The program instructions include not only machine language code made by a compiler but also high level code that may be used by an interpreter etc., which is executed by a computer.

As is apparent from the above, according to an embodiment of the present disclosure, since applications do not need to support various network protocols used by IoT devices, resources required for development can be reduced.

In addition, according to an embodiment of the present disclosure, developers can focus on developing the essential functions of the application except for the communication function, thereby facilitating development, reducing application development costs and shortening the development period.

The effects of the present disclosure are not limited to those described above, and other effects that are not described above will be clearly understood by those skilled in the art from the above detailed description.

Although the present disclosure has been described in detail above with reference to the exemplary embodiments, those of ordinary skill in the technical field to which the present disclosure pertains should be able to understand that various modifications and alterations may be made without departing from the technical spirit or essential features of the present disclosure.

What is claimed is:

1. A method for data interworking between an application device and an Internet of Thing (IoT) device, the method comprising:
    generating, by a middleware device, matching information between identifiers of a plurality of IoT devices and network protocols used by the plurality of IoT devices based on IoT device profile information regarding the plurality of IoT devices;
    analyzing, by the middleware device, a request message received from the application device to extract an identifier of a target IoT device from the identifiers;
    searching, by the middleware device, for a network protocol of the network protocols used by the target IoT device in the matching information using the identifier of the target IoT device;
    generating, by the middleware device, a request packet conforming to the network protocol used by the target IoT device based on the request message;
    transmitting, by the middleware device, the request packet to the target IoT device;
    converting, by the middleware device, a response packet, transmitted by the target IoT device in response to the request packet, into a message to be transmitted to the application device; and
    transmitting, by the middleware device, the converted message to the application device,
    wherein the profile information conforms to a JavaScript object notation (JSON) data format, and includes the identifiers of the plurality of IT devices, the network protocols used by the plurality of IoT devices, and resource names, types, and automatic event settings of sensing data received by the plurality of IT devices,
    wherein the automatic event settings include activation status information and an event occurrence interval,
    wherein converting the response packet includes:
        converting, by the middleware device, with reference to the profile information, the response packet into an event message in the JSON data format in response to the activation status information of the response packet being true, and
        converting, by the middleware device, with reference to the profile information, the response packet into a response message in the JSON data format in response to the activation status information of the response packet being false, and
    wherein transmitting the converted message to the application device includes, transmitting the event message to the application device according to the event occurrence interval of the response packet in response to the activation status information of the response packet being true.

2. The method of claim 1, wherein the request message conforms to the JSON data format.

3. The method of claim 1, wherein the IoT device profile information includes information for controlling an actuator associated with the IoT device.

4. A middleware device for performing data interworking between an application device and an Internet of Thing (IoT) device, the middleware device comprising:
    a communication device configured to receive a request message from an application device;
    a profile information processing module configured to generate matching information between identifiers of a plurality of IoT devices and network protocols used by the plurality of IoT devices based on IoT device profile information regarding the plurality of IoT devices;
    a message analysis module configured to analyze the request message to extract an identifier of a target IoT device from the identifiers;
    a packet generating module configured to:
        search for a network protocol of the network protocols used by the target IoT device in the matching information using the identifier of the target IoT device, and
        generate a request packet conforming to the network protocol used by the target IoT device of the request message-based on the request message; and
    a message generating module configured to convert a response packet, transmitted by the target IoT device in response to the request packet, into a message to be transmitted to the application device,
    wherein the communication device is configured to transmit the request packet to the target IoT device, receive the response packet from the target IoT device, and transmit the converted message to the application device,
    wherein the profile information conforms to a JavaScript object notation (JSON) data format, and includes the identifiers of the plurality of IoT devices, the network protocols used by the plurality of IoT devices, and resource names, types, and automatic event settings of sensing data received by the plurality of IoT devices,
    wherein the automatic event settings include activation status information and an event occurrence interval,
    wherein the message generating module is configured to:
        convert, with reference to the profile information, the response packet into an event message in the JSON data format in response to the activation status information of the response packet being true, and
        convert, with reference to the profile information, the response packet into a response message in the JSON data format in response to the activation status information of the response packet being false, and wherein transmitting the converted message to the application device includes, transmitting the event message to the application device according to the event occurrence interval of the response packet in response to the activation status information of the response packet being true.

5. The middleware device of claim 4, wherein the request message conforms to the JSON data format.

* * * * *